United States Patent
Hong et al.

(10) Patent No.: US 10,168,594 B2
(45) Date of Patent: Jan. 1, 2019

(54) LIQUID CRYSTAL DISPLAY

(71) Applicant: SAMSUNG DISPLAY CO., LTD., Yongin-si, Gyeonggi-do (KR)

(72) Inventors: Ki Pyo Hong, Hwaseong-si (KR); Youn Hak Jeong, Cheonan-si (KR); Wan Namgung, Asan-si (KR); Hyung Jun Park, Seongnam-si (KR); Yun Seok Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 132 days.

(21) Appl. No.: 15/139,518

(22) Filed: Apr. 27, 2016

(65) Prior Publication Data

US 2016/0349588 A1 Dec. 1, 2016

(30) Foreign Application Priority Data

May 27, 2015 (KR) .................. 10-2015-0073959

(51) Int. Cl.
*G02F 1/1362* (2006.01)
*G02F 1/1343* (2006.01)

(52) U.S. Cl.
CPC .... *G02F 1/136286* (2013.01); *G02F 1/13624* (2013.01); *G02F 2001/134345* (2013.01)

(58) Field of Classification Search
CPC ......... G02F 1/133707; G02F 1/134309; G02F 2001/134345; G02F 1/136286; G02F 1/13624

See application file for complete search history.

(56) References Cited

U.S. PATENT DOCUMENTS

2004/0095521 A1* 5/2004 Song ................. G02F 1/133514
  349/61
2013/0342777 A1* 12/2013 Jeong ................ G02F 1/134336
  349/38

FOREIGN PATENT DOCUMENTS

| KR | 1020070097308 A | 10/2007 |
| KR | 1020110098857 A | 9/2011 |
| KR | 1020140100126 A | 8/2014 |

* cited by examiner

*Primary Examiner* — Jessica M Merlin
(74) *Attorney, Agent, or Firm* — Cantor Colburn LLP

(57) ABSTRACT

A liquid crystal display includes a first substrate including pixels, a gate line disposed on the first substrate, data lines disposed on the first substrate, a first reference voltage line and a second reference voltage line respectively disposed on the first substrate and applying a first reference voltage and a second reference voltage having different polarities from each other, a pixel electrode disposed in one pixel area and including a first subpixel electrode and a second subpixel electrode, where a first pixel column may overlap the first reference voltage line and the second reference voltage line, a second pixel column adjacent to the first pixel column may not overlap the first reference voltage line and the second reference voltage line, and a first width of the pixel electrode of the first pixel column may be different from a second width of the pixel electrode of the second pixel column.

11 Claims, 8 Drawing Sheets

LIQUID CRYSTAL DISPLAY

This application claims priority to Korean Patent Application No. 10-2015-0073959 filed on May 27, 2015, and all the benefits accruing therefrom under 35 U.S.C. § 119, the content of which in its entirety is herein incorporated by reference.

BACKGROUND

1. Field

The exemplary embodiments relate generally to a liquid crystal display.

2. Description of the Related Art

Liquid crystal displays ("LCDs") are one of the most widely used flat panel displays, and an LCD generally includes a pair of panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines the orientations of LC molecules therein to adjust polarization of incident light thereto.

Among the LCDs, a vertically aligned mode LCD, in which liquid crystal molecules are aligned so that long axes of the liquid crystal molecules are perpendicular to the upper and lower panels while no electric field is applied, has been in the limelight because its contrast ratio is high and a wide reference viewing angle is easily implemented. Herein, the reference viewing angle refers to a viewing angle at which a contrast ratio is 1:10 or a luminance inversion limit angle between grays.

For such an LCD mode, in order to make lateral visibility close to front visibility, a method has been proposed in which one pixel is divided into two subpixels having different transmittance by applying different voltages to the two subpixels.

SUMMARY

In a case where one pixel is divided into two subpixels and a voltage of any one subpixel thereof is lowered, as a result, voltages of the two subpixels are different from each other, luminance of the lateral side is increased compared with the front in a low gray, and thus it is difficult to accurately express a gray in a low gray region, and the entire luminance is lowered as compared with the applied pixel voltage, and as a result, there is a problem in that driving efficiency is lowered.

When an area in which two signal wires for inputting signals having different polarities with respect to a common voltage to respective pixel areas overlap a pixel electrode is changed, a pixel voltage is also changeable. Further, when a difference between aperture ratios of adjacent pixels occurs, a brightness difference between the adjacent pixels may occur.

The described technology has been made in an effort to provide a liquid crystal display ("LCD") that is capable of accurately expressing a gray in a low gray region while making lateral visibility close to front visibility, preventing deterioration of luminance compared to an applied driving voltage, preventing variation of a pixel voltage by two signal wires for inputting signals having different polarities, and preventing a brightness difference between adjacent pixels by preventing a difference between aperture ratios of the adjacent pixels.

An exemplary embodiment provides an LCD including a first substrate including a plurality of pixels, a gate line disposed on the first substrate, a plurality of data lines disposed on the first substrate, a first reference voltage line and a second reference voltage line respectively disposed on the first substrate and applying a first reference voltage and a second reference voltage having different polarities from each other, a pixel electrode disposed in one pixel area and including a first subpixel electrode and a second subpixel electrode, a first switching element connected to the gate line, a first data line of the plurality of data lines, and the first subpixel electrode, a second switching element connected to the gate line, the first data line, and the second subpixel electrode, and a third switching element connected to the gate line, the first subpixel electrode, and one of the first reference voltage line and the second reference voltage line, wherein a first pixel column among the plurality of pixels may overlap the first reference voltage line and the second reference voltage line, a second pixel column adjacent to the first pixel column among the plurality of pixel may not overlap the first reference voltage line and the second reference voltage line, and a first width of the pixel electrode of the first pixel column may be different from a second width of the pixel electrode of the second pixel column.

In an exemplary embodiment, the first width may be greater than the second width, and the first width may be about 1.05 times the second width.

In an exemplary embodiment, the LCD may further include a second substrate facing the first substrate, and a common electrode disposed on the second substrate and to which a common voltage is applied, wherein the first subpixel electrode and the second subpixel electrode may respectively include a plate-shaped portion and a plurality of branch electrodes extending from the plate-shaped portion, the common electrode may include a cross-shaped cutout, and the cross-shaped cutout of the common electrode may overlap the plate-shaped portion.

In an exemplary embodiment, the first reference voltage line and the second reference voltage line may respectively overlap the plate-shaped portion of the pixel electrode of the first pixel column.

In an exemplary embodiment, the first reference voltage line and the second reference voltage line may respectively overlap the cross-shaped cutout of the common electrode.

In an exemplary embodiment, the first reference voltage applied to one of the first reference voltage line and the second reference voltage line that are connected to the third switching element or the second reference voltage, and a data voltage applied to the data line, may have the same polarity with respect to the common voltage.

In an exemplary embodiment, the first reference voltage and the second reference voltage may have a predetermined constant value, and the polarities thereof may be varied for each frame.

According to the embodiment, it is possible to accurately express a gray in a low gray region while making lateral visibility close to front visibility, to prevent deterioration of luminance compared to an applied driving voltage, to prevent variation of a pixel voltage by two signal wires for inputting signals having different polarities, and to prevent a brightness difference between adjacent pixels by preventing a difference between aperture ratios of the adjacent pixels.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
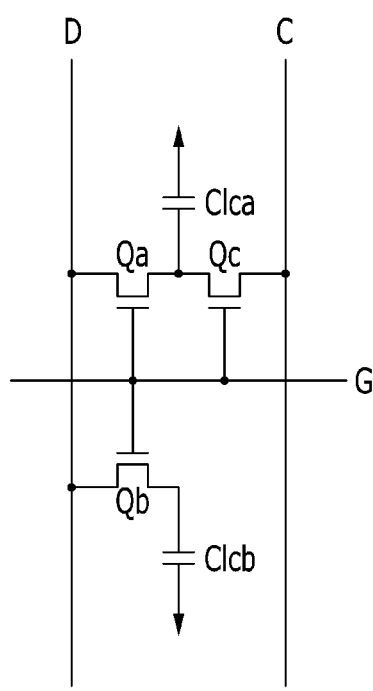
FIG. 1 illustrates an equivalent circuit diagram of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

A signal line of a liquid crystal display ("LCD"), a connection between pixels, and a driving method thereof according to an exemplary embodiment will now be described with reference to FIG. 1.

Referring to FIG. 1, an LCD according to the exemplary embodiment includes signal lines G, D, and C, and a first switching element Qa, a second switching element Qb, a third switching element Qc, a first liquid crystal capacitor Clca, and a second liquid crystal capacitor Clcb that are respectively connected to the signal lines.

Each of the first switching element Qa and the second switching element Qb is connected to the gate line G and the data line D, and the third switching element Qc is connected to the gate line G, the reference voltage line C, and an output terminal of the first switching element Qa.

The first switching element Qa and the second switching element Qb are each a three-terminal element such as a thin film transistor ("TFT"), and the control terminal thereof is connected to the gate line G while the input terminal thereof is connected to the data line D. Further, the output terminal of the first switching element Qa is connected to the first liquid crystal capacitor Clca and the output terminal of the third switching element Qc, and the output terminal of the second switching element Qb is connected to the second liquid crystal capacitor Clcb.

The third switching element Qc is also a three-terminal element such as a TFT, and the control terminal thereof is connected to the gate line G, the input terminal thereof is connected to the reference voltage line C, and the output terminal thereof is connected to the first liquid crystal capacitor Clca.

When a gate-on signal is applied to the gate line G, the first switching element Qa, the second switching element Qb, and the third switching element Qc that are connected to the gate line G are turned on. Accordingly, a data voltage applied to the data line D is applied to one terminal of each of the first liquid crystal capacitor Clca and the second liquid crystal capacitor Clcb respectively through the first switching element Qa and the second switching element Qb that are turned on. In this case, the first liquid crystal capacitor Clca and the second liquid crystal capacitor Clcb are charged with the same voltage.

Simultaneously, one terminal of the first liquid crystal capacitor Clca is connected to the output terminal of the third switching element Qc, and thus is boosted by the reference voltage which is applied to the reference voltage line C through the third switching element Qc.

In this case, the reference voltage applied to the reference voltage line C has the same polarity as the data voltage applied to the data line D, and an amplitude of the reference voltage may be greater than that of the data voltage applied to the data line D. Accordingly, a relatively high voltage that is applied to the reference voltage line C through the third switching element Qc is divided, and the voltage charged in the first liquid crystal capacitor Clca is higher than the data voltage applied through the data line D.

Figure 2:
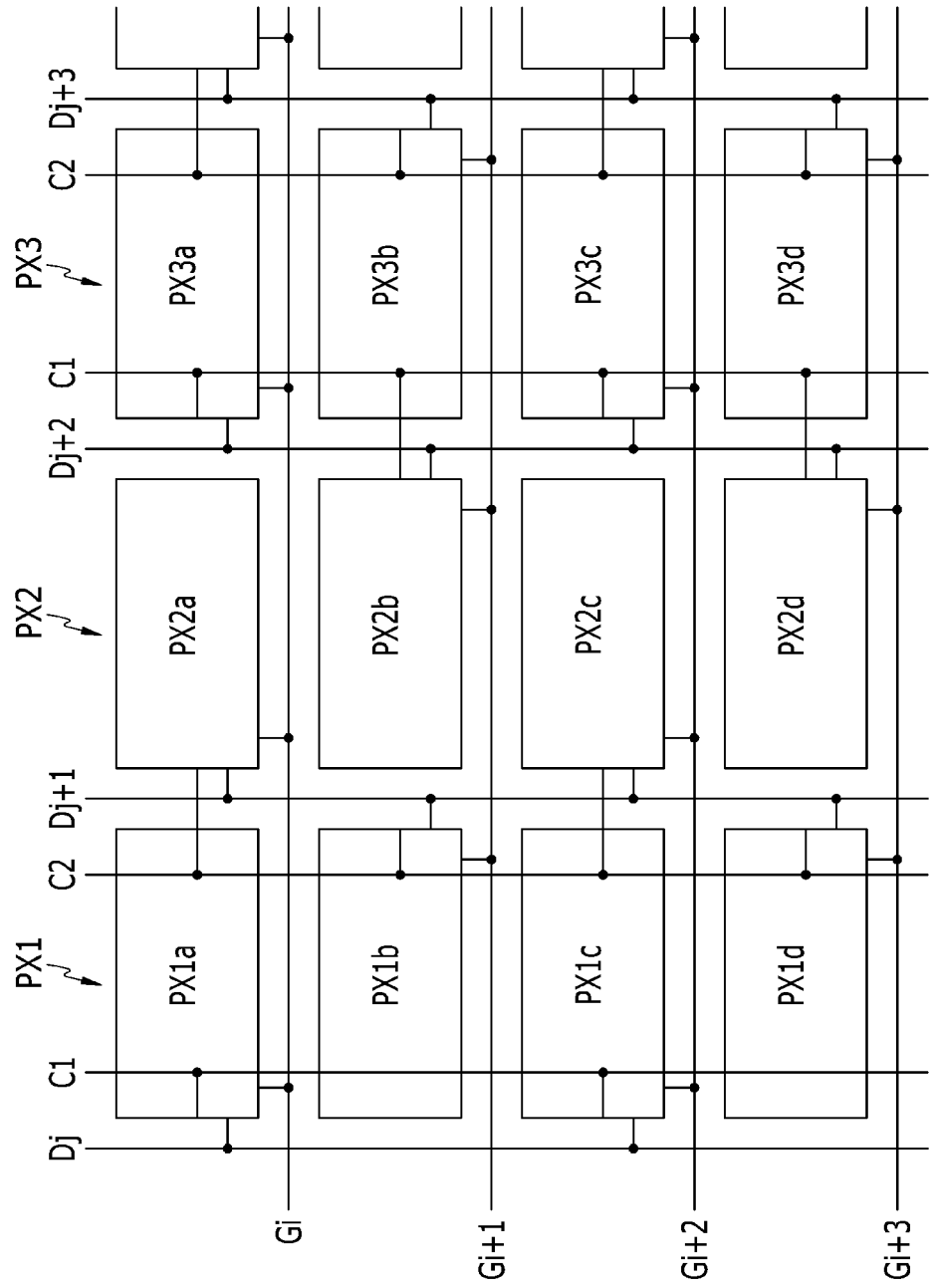
FIG. 2 illustrates an exemplary embodiment of signal lines and a connection relationship between pixel electrodes of an LCD according to the invention.

Next, a plurality of pixel signal lines and a connection relationship between pixel electrodes of an LCD according to an exemplary embodiment will be described with reference to FIG. 2. FIG. 2 illustrates signal lines and a connection relationship between pixel electrodes of an LCD according to an exemplary embodiment.

Referring to FIG. 2, an LCD according to an exemplary embodiment includes a plurality of signal lines Gi, Gi+1, Gi+2, Gi+3, Dj, Dj+1, Dj+2, Dj+3, C1, and C2, and a plurality of pixel electrodes connected to the plurality of signal lines.

The signal lines consists of a plurality of gate lines Gi, Gi+1, Gi+2, and Gi+3, a plurality of data lines Dj, Dj+1, Dj+2, and Dj+3, a first reference voltage line C1, and a second reference voltage line C2.

The first reference voltage line C1 and the second reference voltage line C2 extend substantially parallel to the plurality of data lines Dj, Dj+1, Dj+2, and Dj+3, and are disposed between the first data line Dj and the second data line Dj+1 adjacent to each other. Further, the first reference voltage line C1 and the second reference voltage line C2 are not disposed between the second data line Dj+1 and the third data line Dj+2 adjacent to each other, but are disposed between the third data line Dj+2 and the fourth data line Dj+3 adjacent to each other.

A plurality of first pixel electrodes PX1a, PX1b, PX1c, and PX1d of a first pixel column PX1 disposed between the first data line Dj and the second data line Dj+1 overlaps the first reference voltage line C1 and the second reference voltage line C2.

A plurality of second pixel electrodes PX2a, PX2b, PX2c, and PX2d of a second pixel column PX2 that is disposed between the second data line Dj+1 and the third data line Dj+2 and is adjacent to the first pixel column PX1 does not overlap the first reference voltage line C1 and the second reference voltage line C2.

Further, a plurality of third pixel electrodes PX3a, PX3b, PX3c, and PX3d of a third pixel column PX3 that is disposed between the third data line Dj+2 and the fourth data line Dj+3 and is adjacent to second pixel column PX2 overlaps the first reference voltage line C1 and the second reference voltage line C2.

As such, according to the exemplary embodiment, the pixel electrodes overlapping and not overlapping the first reference voltage line C1 and the second reference voltage line C2 along the pixel columns are alternately disposed in a row direction.

The LCD according to the exemplary embodiment includes the first pixel column PX1 in which the first reference voltage line C1 and the second reference voltage line C2 are disposed, the second pixel column PX2 which is adjacent to the first pixel column PX1 and in which the first reference voltage line C1 and the second reference voltage line C2 are not disposed, and the third pixel column PX3 which is adjacent to the second pixel column PX2 and in which the first reference voltage line C1 and the second reference voltage line C2 are disposed.

A polarity of data voltages applied to the first data line Dj and the third data line Dj+2 is the same as that of a first reference voltage applied to the first reference voltage line C1, and a polarity of data voltages applied to the second data line Dj+1 and the fourth data line Dj+3 is the same as that of a second reference voltage applied to the second reference voltage line C2. Further, the polarity of the first reference voltage applied to the first reference voltage line C1 and the polarity of the second reference voltage applied to the second reference voltage line C2 are opposite to each other. The polarity of the first reference voltage applied to the first reference voltage line C1 and the polarity of the second reference voltage applied to the second reference voltage line C2 are changed for each frame.

The plurality of first pixel electrodes PX1a, PX1b, PX1c, and PX1d of the first pixel column PX1 disposed between the first data line Dj and the second data line Dj+1 is alternately connected to the first data line Dj and the second data line Dj+1, and is alternately connected to the first reference voltage line C1 and the second reference voltage line C2 along a column direction. The polarities of the voltages applied to the data line connected to the plurality of first pixel electrodes PX1a, PX1b, PX1c, and PX1d of the first pixel column PX1 and to the reference voltage line are the same as each other.

The plurality of second pixel electrodes PX2a, PX2b, PX2c, and PX2d of the second pixel column PX2 that is disposed between the second data line Dj+1 and the third data line Dj+2 and is adjacent to the first pixel column PX1 is alternately connected to the second data line Dj+1 and the third data line Dj+2 along a column direction, and are alternately connected to the second reference voltage line C2 disposed in the first pixel column PX1 adjacent to the second pixel column PX2 and the first reference voltage line C1 disposed in the third pixel column PX3 adjacent to the second pixel column PX2. The polarities of the voltages applied to the data line connected to the plurality of second pixel electrodes PX2a, PX2b, PX2c, and PX2d of the second pixel column PX2 and to the reference voltage line are the same as each other.

Alternatively, the plurality of third pixel electrodes PX3a, PX3b, PX3c, and PX3d of the third pixel column PX3 that is disposed between the third data line Dj+2 and the fourth data line Dj+3 and is adjacent to the second pixel column PX2 is alternately connected to the third data line Dj+2 and the fourth data line Dj+3, and are alternately connected to the first reference voltage line C1 disposed in the third pixel column PX3 and the second reference voltage line C2. The polarities of the voltages applied to the data line connected to the plurality of third pixel electrodes PX3a, PX3b, PX3c, and PX3d of the third pixel column PX3 and to the reference voltage line are the same as each other.

Further, a first width of the pixel electrode that overlaps the first reference voltage line C1 and the second reference voltage line C2 along the pixel column and a second width of the pixel electrode that does not overlap the first reference voltage line C1 and the second reference voltage line C2 along the pixel column are different from each other.

In an exemplary embodiment, a ratio of the first width to the second width may be equal to or less than about 1.05, for example. That is, the first width may be greater than the second width by about 5% of the second width, for example.

As such, by differently forming the width of the pixel electrode that overlaps the first reference voltage line C1 and the second reference voltage line C2 along the pixel column and the width of the pixel electrode that does not overlap the first reference voltage line C1 and the second reference voltage line C2 along the pixel column, it is possible to prevent a difference between aperture ratios of the pixel column that overlaps the first reference voltage line C1 and the second reference voltage line C2 and the pixel column that does not overlap the first reference voltage line C1 and the second reference voltage line C2 from occurring. As such, by preventing occurrence of the difference between the aperture ratios of two pixel columns, the brightness difference due to the difference between the aperture ratios of the two pixel columns may be prevented, thereby preventing display quality from deteriorating.

Figure 3:
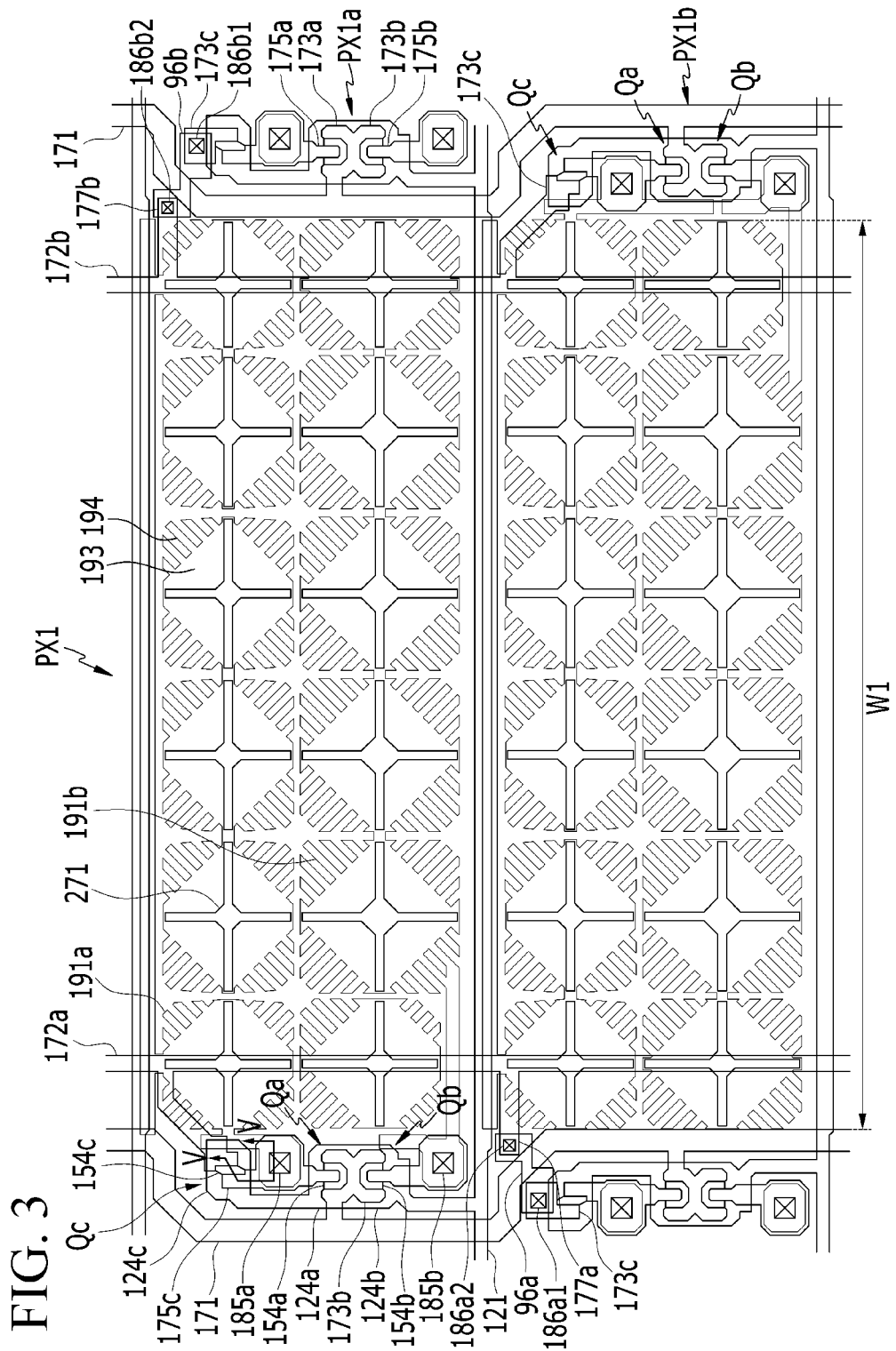
FIG. 3 illustrates a partial plan view of an exemplary embodiment of an LCD according to the invention.

Next, a structure of a plurality of pixels according to an exemplary embodiment will be described with reference to FIGS. 3 to 5. FIG. 3 illustrates a partial plan view of an LCD according to an exemplary embodiment, FIG. 4 illustrates a partial plan view of an LCD according to another exemplary embodiment, and FIG. 5 illustrates a cross-sectional view of the LCD taken along line V-V of FIG. 3.

Figure 4:
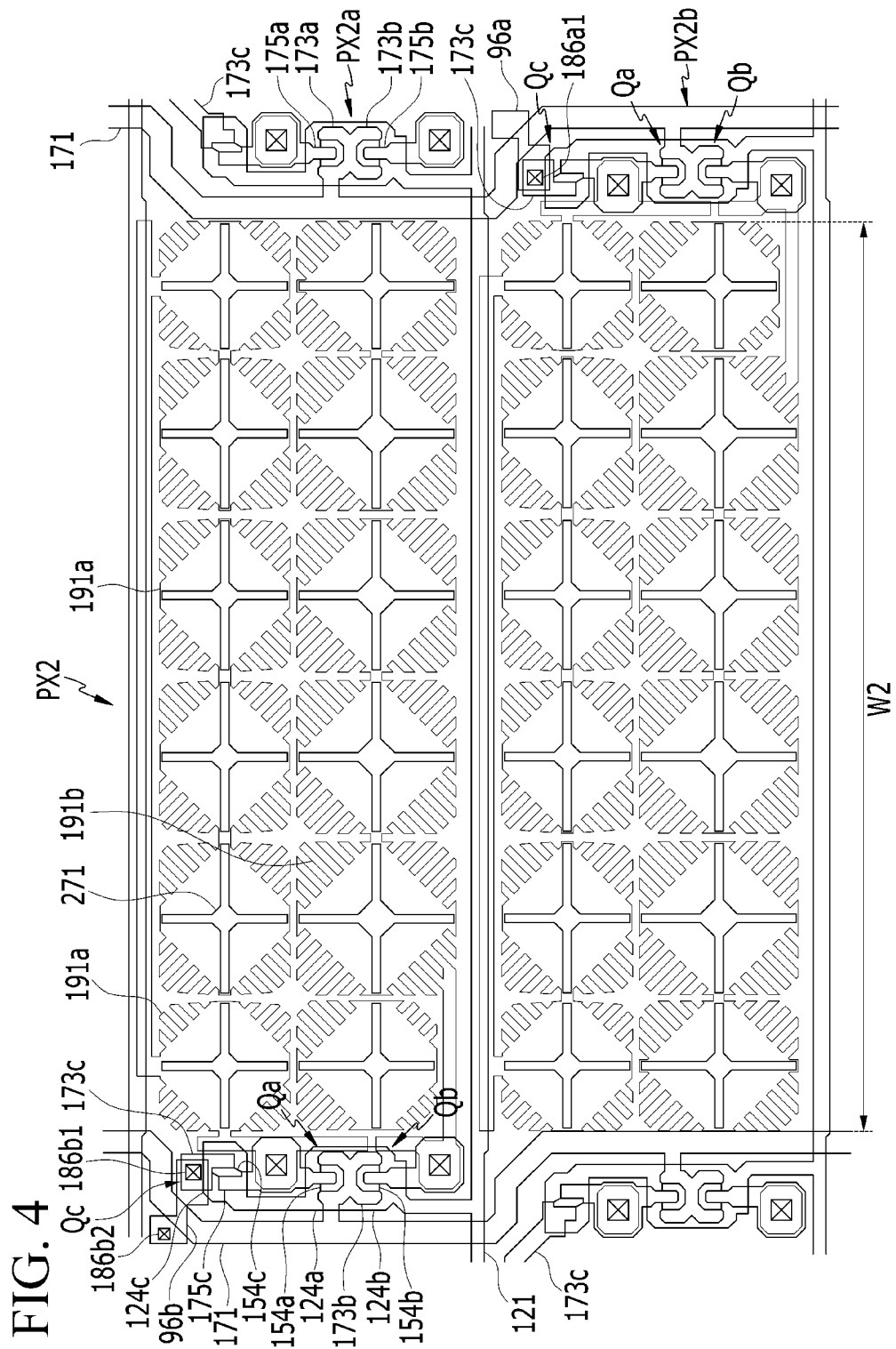
FIG. 4 illustrates a partial plan view of another exemplary embodiment of an LCD according to the invention.
Figure 5:
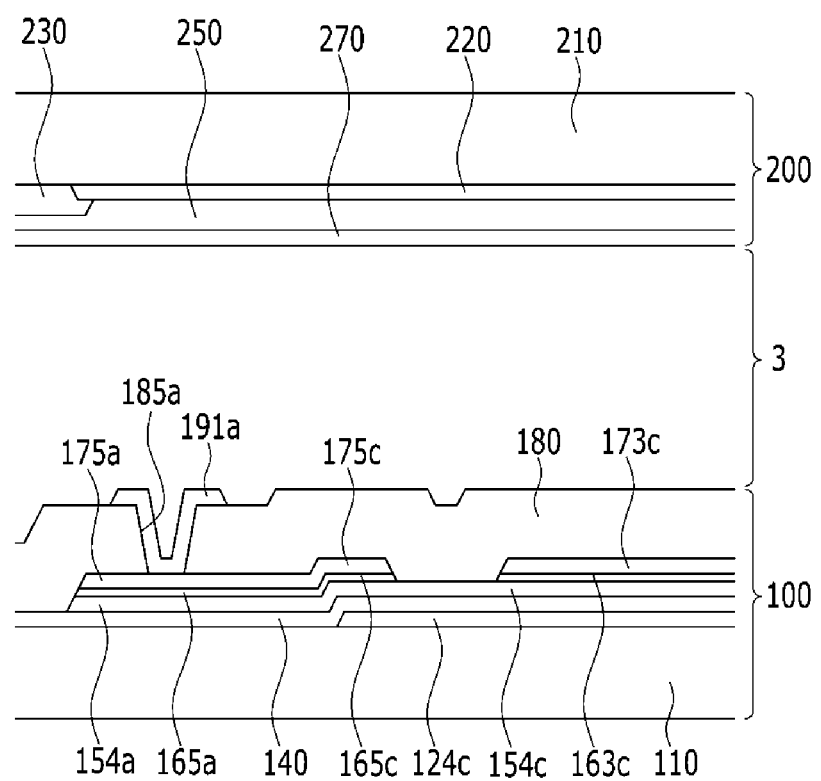
FIG. 5 illustrates a cross-sectional view of the LCD taken along line V-V of FIG. 3.

Referring to FIGS. 3 to 5, an LCD according to the exemplary embodiment includes a first display panel 100 and a second display panel 200 that face each other, and a liquid crystal layer 3 injected between the display panels 100 and 200.

First, the first display panel 100 will be described.

A plurality of gate lines 121 is disposed on a first substrate 110.

Each of the gate lines 121 transmits a gate signal, and includes a first gate electrode 124a, a second gate electrode 124b, and a third gate electrode 124c.

A gate insulating layer 140 is disposed on the plurality of gate lines 121.

A plurality of first semiconductors 154a, a plurality of second semiconductors 154b, and a plurality of third semiconductors 154c are disposed on the gate insulating layer 140.

A plurality of ohmic contacts 165a, 163c, and 165c is disposed on the plurality of first semiconductors 154a, the plurality of second semiconductors 154b, and the plurality of third semiconductors 154c.

In an exemplary embodiment, the semiconductors 154a, 154b, and 154c may include an oxide semiconductor, and when the semiconductors 154a, 154b, and 154c include the oxide semiconductor, the ohmic contacts may be omitted.

A data conductor including a plurality of data lines 171 including a plurality of first source electrodes 173a and a plurality of second source electrodes 173b, a plurality of third source electrodes 173c, a plurality of first drain electrodes 175a, a plurality of second drain electrodes 175b, a plurality of third drain electrodes 175c, a first reference voltage line 172a, and a second reference voltage line 172b are disposed on the plurality of ohmic contacts 165a, 163c, and 165c and the gate insulating layer 140.

The first drain electrode 175a and the third drain electrode 175c are connected to each other.

The first reference voltage line 172a and the second reference voltage line 172b extend substantially parallel to the data line 171, and each of the first and second reference voltage lines 172a and 172b is provided per two pixel columns.

The first reference voltage line 172a includes a first expansion 177a extending to a pixel column adjacent to the first reference voltage line 172a, and the second reference voltage line 172b includes a second expansion 177b extending to a pixel column adjacent to the second reference voltage line 172b.

A passivation layer 180 is disposed on data conductors 171, 172a, 172b, 173a, 173b, 173c, 175a, 175b, and 175c. The passivation layer 180 may include an inorganic insulator or an organic insulator.

A first contact hole 185a partially exposing the first drain electrode 175a and a second contact hole 185b partially exposing the second drain electrode 175b are defined in the passivation layer 180.

A third contact hole 186a1 exposing the first expansion 177a of the first reference voltage line 172a and a fourth contact hole 186a2 exposing a third source electrode 173c adjacent to the first expansion 177a among the plurality of third source electrodes 173c are defined in the passivation layer 180. Similarly, a fifth contact hole 186b1 exposing the second expansion 177b of the second reference voltage line 172b, and a sixth contact hole 186b2 exposing a third source electrode 173c adjacent to the second expansion 177b among the plurality of third source electrodes 173c are defined in the passivation layer 180.

A first subpixel electrode 191a, a second subpixel electrode 191b, a first connecting member 96a, and a second connecting member 96b are disposed on the passivation layer 180.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b each include a plate-shaped portion 193 having a rhombus shape, and a plurality of branch electrodes 194 extending in four different directions from the plate-shaped portion 193. The plurality of branch electrodes 194 include a portion obliquely extending in an upper right direction, a portion obliquely extending in a lower right direction, a portion obliquely extending in an upper left direction, and a portion obliquely extending in a lower left direction. As such, the liquid crystal molecules of the liquid crystal layer 3 are inclined in different directions at portions at which the branch electrodes 194 extend in different directions. Accordingly, four domains at which the liquid crystal molecules are inclined in different directions are provided in the liquid crystal layer 3. As such, when the inclination directions of the liquid crystal molecules are diversified, a reference viewing angle of the LCD is increased.

The first subpixel electrode 191a and the second subpixel electrode 191b are each divided into a plurality of subareas by the plate-shaped portion 193 having the rhombus shape and the plurality of branch electrodes 194 extending in the four different directions from the plate-shaped portion 193.

In an exemplary embodiment, the second subpixel electrode 191b may have a larger area than that of the first subpixel electrode 191a.

However, the first subpixel electrode 191a and the second subpixel electrode 191b of the LCD according to the exemplary embodiment are not limited thereto, and a first subpixel electrode 191a and a second subpixel electrode 191b of an LCD according to another exemplary embodiment may have various shapes different from each other.

The first connecting member 96a is disposed on the third contact hole 186a1 and the fourth contact hole 186a2 to connect the first expansion 177a and the third source electrode 173c of the first reference voltage line 172a which are adjacent to each other. Similarly, the second connecting member 96b is disposed on the fifth contact hole 186b1 and the sixth contact hole 186b2 to connect the second expansion 177b and the third source electrode 173c of the second reference voltage line 172b which are adjacent to each other.

The first gate electrode 124a, the first semiconductor 154a, the first source electrode 173a, and the first drain electrode 175a define a first switching element Qa, the second gate electrode 124b, the second semiconductor 154b, the second source electrode 173b, and the second drain electrode 175b define the second switching element Qb, and the third gate electrode 124c, the third semiconductor 154c, the third source electrode 173c, and the third drain electrode 175c define the third switching element Qc.

The second display panel 200 will now be described.

A light blocking member 220 is disposed on a second substrate 210. The light blocking member 220 is referred to as a black matrix, and blocks light leakage. A plurality of color filters 230 is disposed on the second substrate 210 and the light blocking member 220. An overcoat 250 is disposed on the color filter 230. The overcoat 250 prevents the color filter 230 and the light blocking member 220 from being lifted, and suppresses contamination of the liquid crystal layer 3 by an organic material such as a solvent flowing from the color filter 230 to prevent defects such as afterimages that may occur when a screen is driven. In another exemplary embodiment, the overcoat 250 may be omitted. A common electrode 270 is disposed on the overcoat 250.

In the LCD according to the illustrated exemplary embodiment, although the light blocking member 220 and the color filter 230 are disposed on the second display panel 200, a light blocking member 220 and a color filter 230 of an LCD according to another exemplary embodiment may be disposed on the first display panel 100. In this case, a color filter 230 may be disposed instead of the passivation layer 180 of the first display panel 100.

Cross-shaped cutouts 271 that correspond to each subarea of the first subpixel electrode 191a and the second subpixel electrode 191b and overlap the plate-shaped portions 193 of the pixel electrodes 191a and 191b, respectively, may be defined in the common electrode 270.

When the LCD is viewed from above, each subarea of the first subpixel electrode 191a and the second subpixel electrode 191b is divided into four areas by each of the cross-shaped cutouts 271 of the common electrode 270 and the branch electrodes 194 of the pixel electrodes 191a and 191b.

The first subpixel electrode 191a and the common electrode 270 define the first liquid crystal capacitor Clca (refer to FIG. 1) together with the liquid crystal layer 3, and the second subpixel electrode 191b and the common electrode 270 define the second liquid crystal capacitor Clcb (refer to FIG. 1) together with the liquid crystal layer 3 provided therebetween.

An electric field is applied to the liquid crystal layer 3 by voltages applied to the first subpixel electrode 191a and the second subpixel electrode 191b and a common voltage applied to the common electrode, and orientation of the liquid crystal molecules of the liquid crystal layer 3 is determined by the electric field intensity. As such, luminance of the light passing through the liquid crystal layer 3 is variable depending on the orientation of the liquid crystal molecules.

Referring to FIGS. 3 and 4, the third source electrode 173c of the first pixel PX1a of the first pixel column PX1 is directly connected to the first reference voltage line 172a, and the third source electrode 173c of the second pixel PX1b of the first pixel column PX1 is directly connected to the second reference voltage line 172b.

The third source electrode 173c of the third pixel PX2a of the second pixel column PX2 is connected to the second expansion 177b of the second reference voltage line 172b disposed at the first pixel column PX1 adjacent to the second pixel column PX2, and the third source electrode 173c of the fourth pixel PX2b of the second pixel column PX2 is connected to the first expansion 177a of the first reference voltage line 172a disposed at a third pixel column (not shown) adjacent to the second pixel column PX2.

Further, the pixel electrodes 191a and 191b of the first pixel column PX1 overlap the first reference voltage line 172a and the second reference voltage line 172b, and the pixel electrodes 191a and 191b of the second pixel column PX2 adjacent to the first pixel column PX1 do not overlap the first reference voltage line 172a and the second reference voltage line 172b.

The first reference voltage line 172a and the second reference voltage line 172b overlap the plate-shaped portions 193 of the pixel electrodes 191a and 191b, and the cross-shaped cutouts 271 of the common electrode 270. As such, by overlapping the first reference voltage line 172a and the second reference voltage line 172b with the plate-shaped portions 193 of the pixel electrodes 191a and 191b, even when the first reference voltage line 172a, the second reference voltage line 172b, and the pixel electrodes 191a and 191b are misaligned during a manufacturing process, an area in which the first reference voltage line 172a and the second reference voltage line 172b and the pixel electrodes 191a and 191b are overlapped is not substantially changed. When being misaligned in the case that an edge of the branch electrode 194 or edges of the pixel electrodes 191a and 191b instead of the plate-shaped portions 193 of the pixel electrodes 191a and 191b are overlapped, the area in which the first reference voltage line 172a and the second reference voltage line 172b and the pixel electrodes 191a and 191b are overlapped with each other may be greatly changed.

However, the first reference voltage line 172a and the second reference voltage line 172b extended in parallel with the data line 171 and transmitting the first reference voltage and the second reference voltage overlap the plate-shaped portions 193 of the pixel electrodes 191a and 191b to reduce the change of the area overlapping between the first reference voltage line 172a, the second reference voltage line 172b, and the pixel electrodes 191a and 191b. Since the change of the area overlapping between the first reference voltage line 172a, the second reference voltage line 172b, and the pixel electrodes 191a and 191b is reduced, a change of charging capacity is prevented, thereby preventing a change of a pixel voltage due to a change of noise capacitance.

The first reference voltage line 172a and the second reference voltage line 172b respectively transmitting the first reference voltage and the second reference voltage, polarities of which are different from each other, are provided along one pixel column, and the pixel electrodes 191a and 191b overlap both the first reference voltage line 172a and the second reference voltage line 172b in the pixel column, or do not overlap the first reference voltage line 172a and the second reference voltage line 172b in another pixel column. Accordingly, even though the polarities of the first reference voltage and the second reference voltage are changed for each frame, the corresponding pixel voltages are not substantially changed, thereby preventing image quality deterioration such as a flicker due to the change of the pixel voltage.

By forming the first reference voltage line 172a and the second reference voltage line 172b to overlap the cross-shaped cutouts 271 of the common electrode 270, deterioration of the aperture ratio of the LCD may be prevented.

A first width W1 of the pixel electrode of the first pixel column PX1 overlapping the first reference voltage line 172a and the second reference voltage line 172b and a second width W2 of the pixel electrode of the second pixel column PX2 not overlapping the first reference voltage line 172a and the second reference voltage line 172b are different from each other. In an exemplary embodiment, the first width W1 is greater than the second width W2, and a ratio of the first width W1 to the second width W2 may be equal to or less than about 1.05. That is, the first width W1 may be greater within an about 5% range of the second width W2, for example.

As such, by differently forming the width of the pixel electrode of the pixel column overlapping the first reference voltage line and the second reference voltage line and the width of the pixel electrode of the pixel column not overlapping the first reference voltage line and the second reference voltage line, a difference between aperture ratios of the pixel column overlapping the first reference voltage line and the second reference voltage line and the pixel column not overlapping the first reference voltage line and the second reference voltage line may not occur. As described above, by preventing occurrence of the difference between the aperture ratios of two pixel columns, the brightness difference due to the difference between the aperture ratios of the two pixel columns may be prevented, thereby preventing the display quality from deteriorating.

Figure 6:
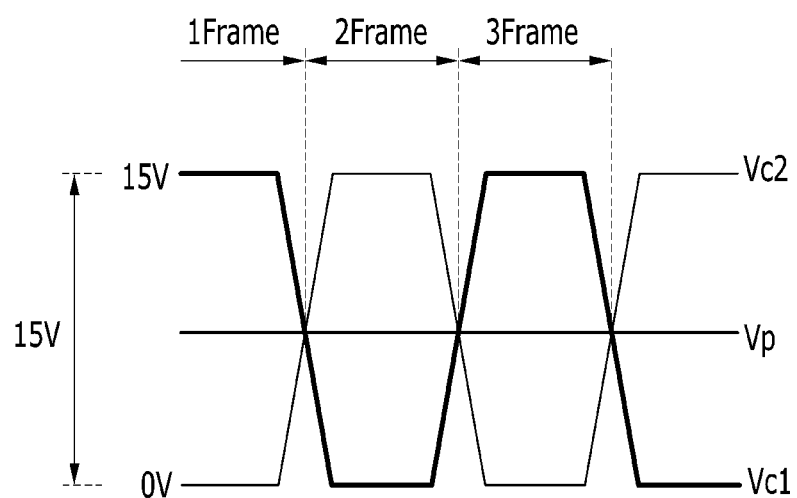
FIG. 6 illustrates a waveform diagram for explaining a voltage variation depending on a voltage applied to each frame in a pixel area.

Next, the first reference voltage and the second reference voltage will be described with reference to FIG. 6. FIG. 6 illustrates a waveform diagram for explaining a voltage variation depending on a voltage applied to each frame in a pixel area.

Referring to FIG. 6, the first reference voltage Vc1 applied to the first reference voltage line 172a has a value of about 15 volts for a first frame, about 0 volt for a second frame, and about 15 volts for a third frame. The second reference voltage Vc2 applied to the second reference voltage line 172b has a value of about 0 volt for a first frame, about 15 volts for a second frame, and about 0 volt for a third frame.

Although the polarities of the first reference voltage Vc1 and the second reference voltage Vc2 having different polarities are changed for respective frames, since the pixel electrodes 191a and 191b overlap the first reference voltage line 172a and the second reference voltage line 172b in one pixel column, or do not overlap the first reference voltage line 172a and the second reference voltage line 172b in another pixel column, the voltage Vp charged in the pixel electrodes 191a and 191b is not influenced, thereby the voltage Vp may be maintained.

Figure 7:
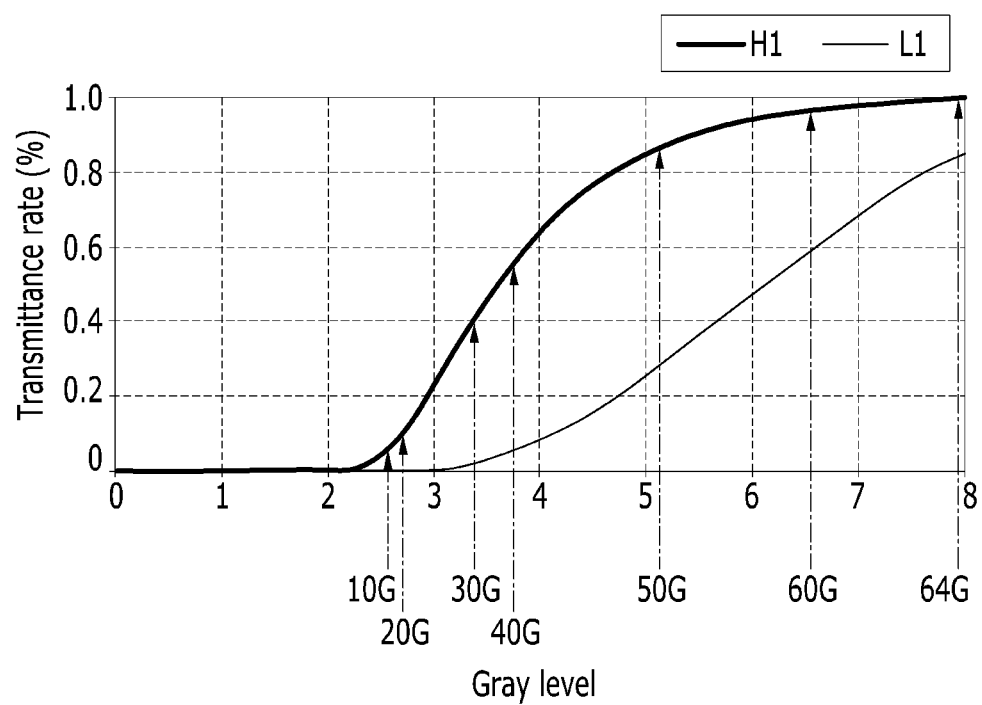
FIGS. 7 and 8 illustrate transmittance graphs varied depending on a pixel voltage of an LCD based on an experimental example of the invention.
Figure 8:
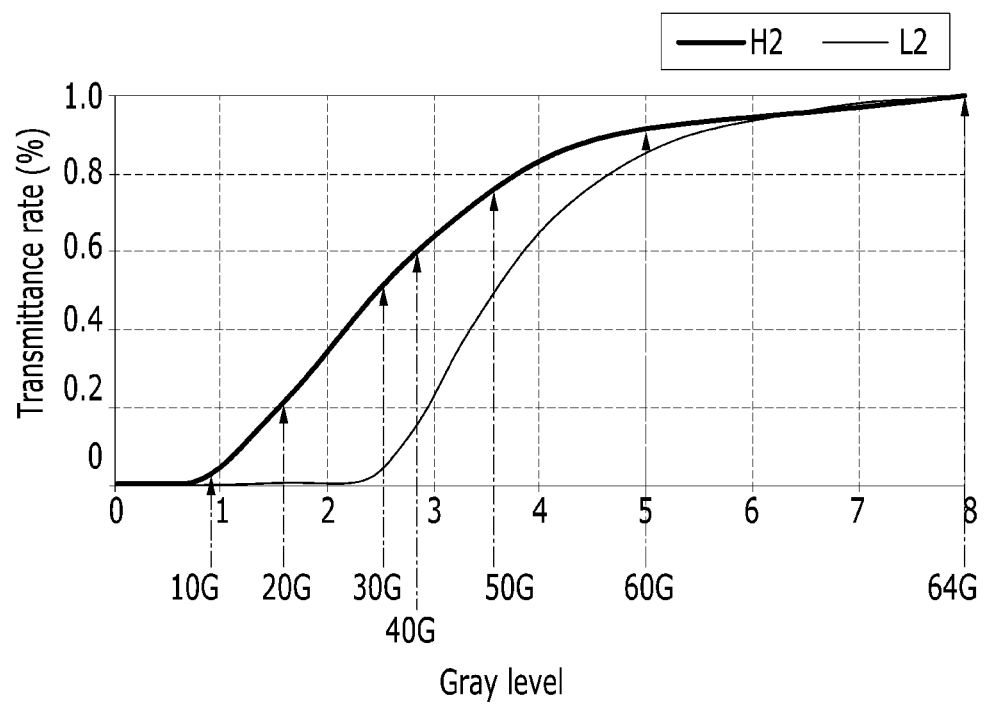

Changes of transmittance according to a pixel voltage of an LCD according to an experimental example of the invention will now be described with reference to FIGS. 7 and 8. FIGS. 7 and 8 illustrate transmittance graphs that are varied depending on a pixel voltage of an LCD based on an experimental example of the invention.

In the experimental example, in a like manner of the conventional LCD, FIG. 7 shows changes H1 of transmittance according to the data voltage applied to the first subpixel electrode and changes L1 of transmittance according to the data voltage applied to the second subpixel electrode when the pixel electrode is classified as a first subpixel electrode and a second subpixel electrode and the voltage applied to the second subpixel electrode is divided to control the voltage at the second subpixel electrode to be less than an input data voltage. In a like manner of the LCD according to an exemplary embodiment, FIG. 8 shows changes H2 of transmittance according to the data voltage applied to the first subpixel electrode and changes L2 of transmittance according to the data voltage applied to the second subpixel electrode when the pixel electrode is classified as a first subpixel electrode and a second subpixel electrode and the voltage at the first subpixel electrode is controlled to be greater than the input data voltage.

Referring to FIG. 7, the voltage at the second subpixel electrode is reduced by a predetermined value from among the first subpixel electrode and the second subpixel electrode to which the same data voltage is applied through the data line. When the input data voltage value is relatively low, for example, when the data voltage is less than about 4 volts, the entire transmittance depends on transmittance of the first subpixel electrode H1. The transmittance rarely changes in a low gray region, for example, to a gray level of about 20 (20 G), so it is impossible to express the gray. An increase rate of transmittance induced by the applied data voltage is increased in the region from a gray level of about 20 (20 G) to a gray level of about 40 (40 G), and the rate of transmittance is abruptly increased so that the screen may look white. As described, it is difficult to express grays following the data voltage in the low gray region. In the case of a high gray region, for example, when the data voltage is about 6.7 volts, the transmittance rate caused by the voltage at the second subpixel electrode is reduced so the entire transmittance of the LCD is less than the input data voltage. Therefore, transmittance efficiency of the LCD becomes less compared to the driving voltage.

Referring to FIG. 8, the voltage at the first subpixel electrode is increased by a predetermined value from among the first subpixel electrode and the second subpixel electrode to which the same data voltage is applied through the data line. The change of transmittance caused by the applied data voltage is manifest in the low gray region so it becomes possible to express the grays in the low gray levels. The increase rate of transmittance caused by the applied data voltage is substantially constant in the low gray region thereby preventing the screen from being expressed as white when the transmittance abruptly increases at a specific gray. Further, in the case of the high gray region, for example, when the data voltage is about 6.7 volts, transmittance is not reduced and the entire transmittance of the LCD is increased. Accordingly, driving efficiency of the LCD is increased.

According to the LCD according to the exemplary embodiment, lateral visibility is controlled to approach front visibility, accurate gray expression is allowable in the low gray region, deterioration of luminance is prevented compared to the driving voltage, changes of the pixel voltage are prevented by the first reference voltage line and the second reference voltage line for transmitting the first voltage and the second voltage having different polarities, and deterioration of the aperture ratio by the first reference voltage line and the second reference voltage line is prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first substrate including a plurality of pixels;
    a gate line disposed on the first substrate;
    a plurality of data lines disposed on the first substrate;
    a first reference voltage line and a second reference voltage line disposed on the first substrate and respectively applying a first reference voltage and a second reference voltage having different polarities from each other;
    a first pixel electrode disposed in a first pixel column and a second pixel electrode disposed in a second pixel column adjacent to the first pixel column, the first pixel electrode and the second pixel electrode each including a first subpixel electrode and a second subpixel electrode;
    a first switching element connected to the gate line, a first data line of the plurality of data lines, and the first subpixel electrode;
    a second switching element connected to the gate line, the first data line, and the second subpixel electrode; and
    a third switching element connected to the gate line, the first subpixel electrode, and one of the first reference voltage line and the second reference voltage line,
    wherein the first pixel electrode overlaps the first reference voltage line and the second reference voltage line,
    the second pixel electrode does not overlap the first reference voltage line and the second reference voltage line,
    the first pixel electrode is connected to the first reference voltage line and the second pixel electrode is connected to the second reference voltage line, and
    a first width of the first pixel electrode is different from a second width of the second pixel electrode.

2. The liquid crystal display of claim 1, wherein the first width is greater than the second width.

3. The liquid crystal display of claim 2, wherein the first width is about 1.05 times the second width.

4. The liquid crystal display of claim 3, further comprising a second substrate facing the first substrate, and a common electrode disposed on the second substrate and to which a common voltage is applied,
    wherein the first subpixel electrode and the second subpixel electrode each include a plate-shaped portion and a plurality of branch electrodes extending from the plate-shaped portion,
    a cross-shaped cutout defined in the common electrode, and
    the cross-shaped cutout of the common electrode overlaps the plate-shaped portion.

5. The liquid crystal display of claim 4, wherein the first reference voltage line and the second reference voltage line each overlap the plate-shaped portion in the first pixel column.

6. The liquid crystal display of claim 5, wherein the first reference voltage line and the second reference voltage line each overlap the cross-shaped cutout of the common electrode.

7. The liquid crystal display of claim 3, wherein the first reference voltage or the second reference voltage applied to one of the first reference voltage line and the second reference voltage line which are connected to the third switching element, and a data voltage applied to the data line, have the same polarity with respect to the common voltage.

8. The liquid crystal display of claim 7, wherein the first reference voltage and the second reference voltage have a predetermined constant value, and polarities thereof are varied for each frame.

9. The liquid crystal display of claim 1, further comprising:
    a second substrate facing the first substrate; and
    a common electrode disposed on the second substrate and to which a common voltage is applied,
    wherein the first subpixel electrode and the second subpixel electrode each include a plate-shaped portion and a plurality of branch electrodes extending from the plate-shaped portion,
    a cross-shaped cutout is defined in the common electrode, and
    the cross-shaped cutout of the common electrode overlaps the plate-shaped portion.

10. The liquid crystal display of claim 9, wherein
    the first reference voltage line and the second reference voltage line overlap the plate-shaped portion in the first pixel column, and
    the first reference voltage line and the second reference voltage line overlap the cross-shaped cutout of the common electrode.

11. The liquid crystal display of claim 1, further comprising:
    a third pixel electrode disposed in the first pixel column and adjacent to the first pixel electrode;
    a fourth pixel electrode disposed in the second pixel column and adjacent to the second pixel electrode;
    a fifth pixel electrode disposed in a third pixel column; and
    a third reference voltage line and a fourth reference voltage line disposed on the first substrate and respectively applying the first reference voltage and the second reference voltage having different polarities from each other;
    wherein the fifth pixel electrode overlaps the third reference voltage line and the fourth reference voltage line,
    the second pixel electrode and the fourth pixel electrode do not overlap the first reference voltage line, the second reference voltage line, the third reference voltage line and the fourth reference voltage line, the third pixel electrode is connected to the second reference voltage line, and the fourth pixel electrode is connected to the third reference voltage line.

* * * * *